Patented Aug. 3, 1954

2,685,588

UNITED STATES PATENT OFFICE 2,685,588

REACTION PRODUCTS OF 1,3,4-THIADIAZOLE-2,5 - DITHOL AND N - SUBSTITUTED THIOCARBAMYL HALIDES AND THEIR PREPARATION

Roland H. Goshorn, Trenton, and William W. Levis, Jr., Wyandotte, Mich., assignors to Sharples Chemicals Inc., a corporation of Delaware No Drawing. Application March 28, 1952, Serial No. 279,246

16 Claims. (Cl. 260—302)

The present invention pertains to a new process for the preparation of new products which are highly useful for various purposes such as chemical intermediates, as oil additives, as vulcanization accelerators, etc.

The structure of these new compounds, and their preparation from N-substituted thiocarbamyl halides and mercaptides of 1,3,4-thiadiazole-2,5-dithiol, is illustrated as follows:

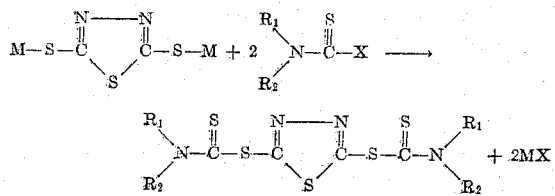

wherein M represents a monovalent metal or metalloid cation such as an alkali metal or ammonium; wherein X represents a halogen; wherein $R_1$, taken individually, represents one of the group consisting of alkyl, aralkyl, aryl, alkaryl, cycloalkyl, alkyl-substituted cycloalkyl, furfuryl, and tetrahydrofurfuryl radicals; wherein $R_2$, taken individually, represents one of the group consisting of alkyl, aralkyl, cycloalkyl, alkyl-substituted cycloalkyl, furfuryl, and tetrahydrofurfuryl radicals; and wherein $R_1$ and $R_2$, taken collectively, represent one of the group consisting of polymethylene and oxapolymethylene radicals.

The foregoing equation illustrates the formation of diesters of 1,3,4-thiadiazole-2,5-dithiol, but it is to be understood that monoesters may likewise be formed by employing an equimolar ratio of reactants, instead of two moles of N-substituted thiocarbamyl halide per mole of dimercaptide as in the formation of diesters. At times such monoesters may be formed as valuable by-products during the preparation of the diesters, and may be advantageously recovered from the reaction mixtures.

The monoesters are, of course, monomercaptides and such monomercaptides may be converted to monomercaptan-monoesters by treatment with a suitable acid, e. g., hydrochloric acid or sulfuric acid.

If desired, the monomercaptide-monoesters may be further reacted with any N-substituted thiocarbamyl halide employed herein, a diester being thus obtained.

The products of the invention, including the diesters, the monomercaptide-monoesters, and the monomercaptan-monoesters, may be represented by the general formula

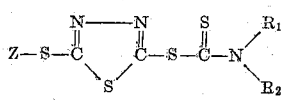

wherein $R_1$ and $R_2$ have the same meanings as in the above equation, and wherein Z represents one of the group consisting of hydrogen, alkali metals, ammonium, and the radical

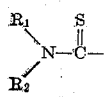

in which radical $R_1$ and $R_2$ have the same meanings as above.

The diester products contain two N-substituted thiocarbamyl radicals, which it will be understood may be the same or different. It will likewise be understood that $R_1$ and $R_2$, when taken individually, may be the same or different in any N-substituted thiocarbamyl radicals which are twice substituted on nitrogen by univalent radicals of the aforesaid kind; this applies both to the products of the invention and to the halide reactants.

Examples of alkali metals are sodium and potassium. Examples of halogens are chlorine, bromine, and iodine.

Examples of alkyl radicals are those containing from 1 to 18 carbon atoms such as methyl, ethyl, propyl, butyl, amyl, etc., and proceeding through octadecyl and higher, and including isomeric forms thereof. Examples of aralkyl radicals are benzyl, phenylethyl and phenylpropyl. Examples of aryl radicals are phenyl, alpha-naphthyl, and beta-naphthyl. Examples of alkaryl radicals are tolyl, xylyl, trimethylphenyl, ethylphenyl, propylphenyl, butylphenyl, methylbutylphenyl, dimethylethylphenyl, methylnaphthyl, butylnaphthyl, di- and trimethylnaphthyl, and ethylbutylnaphthyl, including isomeric forms thereof. Examples of cycloalkyl radicals are cyclopropyl, cyclobutyl, cyclopentyl, cyclohexyl, cycloheptyl, cyclooctyl, and decahydronaphthyl. Examples of alkyl-substituted cycloalkyl radicals are methylcyclohexyl, dimethylcyclohexyl, ethylcyclohexyl, amylcyclohexyl, hexylcyclohexyl, methylcyclobutyl, methylcyclopentyl, methylcycloheptyl, and methylcyclooctyl, including isomeric forms thereof.

When $R_1$ and $R_2$ are taken collectively, examples of such radicals are tetramethylene, pentamethylene, hexamethylene, and 3-oxapentamethylene.

The N-substituted thiocarbamyl halides which may be employed in the reaction include those in which the nitrogen atom is twice substituted by similar alkyl radicals, e. g. dimethyl-, diethyl-, dipropyl-, dibutyl-, diamyl-, dihexyl-, diheptyl-, dioctylthiocarbamyl chlorides, etc.; or by two dissimilar alkyl radicals, e. g. methyl-ethyl-, ethyl-propyl-, methyl-propyl-, methyl-octadecylthiocarbamyl chlorides, etc.; or by a single polymethylene radical, e. g. tetramethylene-, pentamethylene-, hexamethylenethiocarbamyl chlorides, etc.; or by a single oxapolymethylene radical, e. g. 3-oxapentamethylenethiocarbamyl chloride, etc.; or by one aryl and one alkyl radical, e. g. phenyl-methyl-, phenyl-ethyl-, phenyl-propyl-, naphthyl-methylthiocarbamyl chlorides, etc.; or by one alkyl and one alkaryl radical, e. g. methyl-tolyl-, ethyl-tolyl-, propyl-tolyl-, methyl-xylyl-, ethyl-xylyl-, propyl-xylylthiocarbamyl chlorides, etc.; or by one alkyl and one aralkyl radical, e. g. methyl-benzyl-, ethyl-benzyl-, propyl-benzyl-, methyl-phenylethyl-, ethyl-phenylethyl-, propyl-phenylethylthiocarbamyl chlorides, etc.; or by one aryl and one aralkyl radical, e. g. phenyl-benzyl-, phenyl-phenylethylthiocarbamyl chlorides, etc.; or by two aralkyl radicals, e. g. dibenzyl-, benzyl-phenylethyl-, diphenylethylthiocarbamylchlorides, etc.; or by one alkyl and one cycloalkyl radical, e. g. methylcyclohexyl-, ethyl-cyclohexyl-, amyl-cyclohexyl-, methyl-cyclopropylthiocarbamyl chlorides, etc.; or by one alkyl and one alkyl-substituted cycloalkyl radical, e. g. methyl-methylcyclohexyl-, ethyl-amylcyclohexyl-, propyl-methylcyclobutylthiocarbamyl chlorides, etc.; or by one aralkyl and one cycloalkyl radical, e. g. benzyl-cyclohexyl-, phenylethylcyclohexylthiocarbamyl chlorides, etc.; or by one aryl and one cycloalkyl radical, e. g. phenyl-cyclohexyl-, phenyl-cyclopentyl-, naphthyl-cyclohexylthiocarbamyl chlorides, etc.; or by one aryl and one alkyl-substituted cycloalkyl radical, e. g. phenyl-dimethylcyclohexyl-, naphthyl-ethylcyclohexylthiocarbamyl chlorides, etc.; or by one alkaryl and one aralkyl radical, e. g. tolyl-benzyl-, xylyl-benzyl-, methylnaphthyl-benzyl-, tolyl-phenylethylthiocarbamyl chlorides, etc.; or by one alkaryl and one cycloalkyl radical, e. g. xylyl-cyclohexyl-, tolyl-cyclobutyl-, amyl-naphthyl-cyclohexylthiocarbamyl chlorides, etc.; or by one alkaryl and one alkyl-substituted cycloalkyl radical, e. g. tolyl-dimethylcyclohexyl-, methyl-naphthyl- methylcyclohexylthiocarbamyl chlorides, etc.; or by two cycloalkyl radicals, e. g. dicyclopropyl-, dicyclohexyl-, cyclobutyl-cyclopentylthiocarbamyl chlorides, etc.; or by one cycloalkyl and one alkyl-substituted cycloalkyl radical, e. g. cyclohexyl-methylcyclohexyl-, cyclopropyl-methylcyclobutylthiocarbamyl chlorides, etc.; or by two alkyl-substituted cycloalkyl radicals, e. g. bis(methylcyclohexyl)-, methylcyclobutyl-amylcyclohexylthiocarbamyl chlorides, etc.; or by two similar or dissimilar furfuryl or tetrahydrofurfuryl radicals, e. g. difurfuryl-, furfuryltetrahydrofurfuryl-, and bis(tetrahydrofurfuryl)-thiocarbamyl chlorides; or by two dissimilar radicals, e. g. methyl-furfuryl-, amyl-furfuryl-, ethyl-tetrahydrofurfuryl-, benzyl-methylcyclohexyl-, benzyl-furfuryl-, phenylethyl - tetrahydrofurfuryl-, phenyl-furfuryl-, naphthyl-tetrahydrofurfuryl-, xylyl-furfuryl-, tolyl-tetrahydrofurfuryl-, cyclohexyl-furfuryl-, cyclohexyl-tetrahydrofurfuryl-, amylcyclohexyl-furfuryl-, methylcyclohexyl-tetrahydrofurfurylthiocarbamyl chlorides, etc.

Preferably the number of carbon atoms per hydrocarbon radical attached to the nitrogen atom of the N-substituted thiocarbamyl halide does not exceed 12, and more particularly does not exceed 8. Of particular interest are those compounds in which carbamate nitrogen is substituted by a tetramethylene or pentamethylene radical or by two alkyl radicals containing from 1 to 8 carbon atoms in each alkyl radical.

In conducting the reaction, the reactants are brought together and reacted preferably in the presence of a solvent or liquid diluent which is substantially non-reactive or inert in the prevailing environment. Water is excellently suited to this purpose. The mercaptide may be introduced into the N-substituted thiocarbamyl halide or alternatively the latter may be introduced into the former. In general, however, it is preferred to introduce the N-substituted thiocarbamyl halide which may be in the form of a finely divided solid, a liquid, a solution, or a suspension, into an aqueous solution of the mercaptide.

Any desired concentration of said aqueous mercaptide solution may be employed, such as up to the saturation concentration at the prevailing temperature, and in certain instances it may even be desirable to have some of the mercaptide present in solid form. A 20% solution, for example, is very satisfactory when the sodium dimercaptide is being reacted.

The N-substituted thiocarbamyl halide may be added to the aqueous solution or suspension of the mercaptide in the form of a finely divided solid, but more preferably as a liquid, for example, as molten material (in the case of normally solid halides), or in the form of a solution. The particular solvent employed is not highly critical providing it be substantially inert in the reaction environment. Likewise, the amount employed may vary widely, although it may often be desirable to employ sufficient solvent to maintain the halide in liquid phase. Suitable solvents, for example, include hydrocarbons such as hexane, petroleum naphtha, benzene, toluene, etc., and chlorinated hydrocarbons, such as carbon tetrachloride, chlorobenzene, etc.

It will be understood, of course, that the melting points of the N-substituted thiocarbamyl halides coming within the scope of this invention will differ widely; in fact, many are liquids at temperatures well below those contemplated for the preferred conduct of the process. In such event, the non-reacting liquid, if employed, will function primarily as a diluent for the halide, and possibly also as a solvent for the product.

Regardless of the order of addition of the reactants or of the particular physical form of the reactants prior to mixing, it is highly desirable that the reaction mixture be subjected to agitation during the progress of the reaction.

Reaction usually occurs readily at room temperature, reaction temperatures below 100° C. being preferred, such as between 0° C. and 100° C., and more particularly between 20° C. and 80° C. Lower temperatures may be used, but usually are attended by a reduced velocity of reaction and a reduced fluidity of the reaction mixture. Higher temperatures may be employed, but consideration should be given to the thermal stability of the N-substituted thiocarbamyl halide being reacted, as well as of the desired reaction product.

The reaction may be carried out at any desired pressure, such as atmospheric, sub-atmospheric, or super-atmospheric, atmospheric pressure being very suitable. Also the reaction may be carried out in batch, semi-continuously, or continuously as desired.

The organic products of the reaction may be readily purified and may be shown by chemical analysis to correspond closely in empirical formula to the respective expected and desired products. These products are highly effective in increasing the stability of lubricants such as hydrocarbon lubricating oils and greases against oxidative deterioration, sludge formation, and the like, and also impart to such lubricants improved high pressure properties, as described and claimed in co-pending application Serial No. 279,956, filed April 1, 1952. They also are highly effective rubber vulcanization accelerators, many of them being of the delayed action type, as described and claimed in co-pending application Serial No. 271,072, filed February 11, 1952.

The dimercaptide starting materials may be derived from any source known in the art, or may be made by the process exemplified in Example 1 below, which process is described and claimed in co-pending application Serial No. 271,071, filed February 11, 1952.

Likewise, the N-substituted thiocarbamyl halides may be prepared by any means known in the art, such as by the process described and claimed in U. S. Patent 2,466,276.

Substituted thiocarbamyl chlorides are frequently obtained admixed with free sulfur. If desired, the chlorides may be separated from the sulfur before said chlorides are employed as reactants in the present invention. Alternatively, however, such admixtures may be employed for reaction purposes without separation, the sulfur being inert toward the reactants and the desired products. In such event, the products will of course contain sulfur as an impurity; if desired, the sulfur may be readily separated from said products.

The following examples are by way of illustration and not of limitation.

EXAMPLE 1

A 3-neck, 3-liter flask equipped with stirrer, dropping funnel, reflux condenser, and thermometer well was charged with the following: 117 g. of 54.5% aqueous solution of hydrazine (2.0 moles of hydrazine); 160 g. (4.0 moles) of sodium hydroxide in 750 g. of water; and 0.5 g. of a wetting agent, namely, p-tert-octyl-phenoxy-ethoxyethyl dimethyl benzyl ammonium chloride, in 30 g. of water.

Stirring was commenced and 40 g. of carbon disulfide was added. During the next 10 minutes the carbon disulfide went into solution, and the temperature of the reaction mixture increased from 20° C. to 30° C. Addition of carbon disulfide was continued, and the reaction temperature was permitted to rise to 45° C., after which it was maintained between 40° C. and 45° C., by means of an ice bath during the earlier stages of the reaction and of external heating during the later stages. A total of 304 g. (4.0 moles) of carbon disulfide was added during 1.75 hours.

Stirring was continued and temperature conditions were maintained as before for 30 minutes. The odor of hydrogen sulfide became evident at the vent during the early part of this period, and at the end of the period the reaction mixture consisted of a clear yellow solution. This solution was rapidly heated to about 80° C. and stirred at this approximate temperature for 1 hour. Evolution of hydrogen sulfide was copious during most of this period, and was small toward the end of the period.

The solution was allowed to cool to about 40° C. during the next hour. Because of probable losses of carbon disulfide by entrainment with the hydrogen sulfide which had been evolved, stirring was continued and 61 g. (0.8 mole) of carbon disulfide was added to the solution during the following hour. Hydrogen sulfide was evolved in the earlier stages of this period, but by the end of the period the evolution had practically ceased. Stirring was discontinued, and some unreacted carbon disulfide was noted in the reaction mixture. Therefore, in order to remove this carbon disulfide, the mixture was heated to about 60° C. and the system was placed under reduced pressure for a few minutes.

The solution was then cooled to about 25° C., diluted with 650 g. of water, and filtered to remove a small amount of brown tar, the filtrate being clear yellow. There was thus obtained an approximately 20% (by weight) solution of 1,3,4-thiadiazolyl-2,5-disodium mercaptide.

EXAMPLE 2

A 1-liter Erlenmeyer flask equipped with stirrer, thermometer, and gas inlet tube was charged with 592 g. (2.0 moles) of molten, anhydrous tetraethylthiuram disulfide. This liquid was stirred vigorously and chlorine was passed in rapidly, the temperature of the reaction mixture being maintained between 65° C. and 70° C. A total of 142 g. (2.0 moles) of chlorine was added in 30 minutes. The resulting reaction mixture comprised diethylthiocarbamyl chloride and sulfur. Chlorination was discontinued, and the mixture was heated to about 105° C. and stirred until all the free sulfur had dissolved in the diethylthiocarbamyl chloride. This required approximately 30 minutes.

A 20% aqueous solution of 1,3,4-thiadiazolyl-2,5-disodium mercaptide containing 2.0 moles of this product was transferred to a 2-gallon glass vessel equipped with thermometer, electrically heated dropping funnel, and high speed stirrer. The stirrer comprised a stainless steel shaft, at one end of which was a disk 1 inch in diameter and having 16 pitched saw teeth giving downward circulation; this stirrer was driven by a high speed electric motor (7500 R. P. M.)

Stirring was commenced, and the above chloride-sulfur solution, maintained at about 100° C. in the dropping funnel, was slowly added to the mercaptide solution in 45 minutes; occasional cooling was resorted to in order to maintain the reaction mixture between 25° C. to 35° C.

Water (500 g.) was added to improve the fluidity of the resulting thick slurry. Stirring was continued for 45 minutes, at which time 552 g. of 28.2% aqueous solution of sodium sulfide (2.0 moles of the sulfide) was added to the mixture to solubilize the free sulfur, and stirring was continued for another hour.

The mixture was then filtered, and the solid product was thoroughly washed with water and dried at 50° C. The 1,3,4-thiadiazolyl-2,5-bis-(diethyldithiocarbamate) thus obtained was a light tan powder, melting at 93.5–95° C., and weighing 655 g. (85% yield).

A sample of 1,3,4-thiadiazolyl-2,5-bis(diethyldithiocarbamate) was recrystallized once from methyl alcohol and once from acetonitrile. The resulting pure compound melted at 95–96° C. Calculated for $C_{12}H_{20}N_4S_6$: C, 37.86; H, 5.30; N, 14.72; S, 42.12. Found: C, 38.00, 37.85; H, 5.38, 5.33; N, 14.65, 14.73; S, 42.17, 42.35.

EXAMPLE 3

The chlorination apparatus and general procedure of the preceding example were used to react 408 g. (1.0 mole) of tetra-n-butylthiuram disulfide, M. P. 31.5–33.5° C., with 71 g. (1.0 mole) of chlorine in 25 minutes, the temperature of the reaction mixture being maintained between 45° C. and 50° C. Chlorination was discontinued, and the mixture was stirred and heated to between 105° C. and 110° C. for 20 minutes. There was thus provided a solution of sulfur in di-n-butylthiocarbamyl chloride.

An aqueous solution of 1,3,4-thiadiazolyl-2,5-disodium mercaptide weighing 1348 g. and containing 1.0 mole of this compound was reacted with the above sulfur-containing di-n-butylthiocarbamyl chloride, using the same apparatus and general procedure described in the preceding example. Addition of the chloride-sulfur solution was completed in 30 minutes, during which time the temperature of the reaction mixture was maintained between 35° C. and 40° C.

Stirring was continued for 30 minutes. An aqueous solution weighing 340 g. and containing 1.5 moles of sodium sulfide was added, the mixture was stirred at about 30° C. for 1 hour, filtered, washed with water, and dried at 40–45° C. The resulting 1,3,4-thiadiazolyl-2,5-bis(di-n-butyldithiocarbamate) was a light tan powder, M. P. 72.5–76.5° C. The yield was 458 g. (93.3%).

A sample of 1,3,4-thiadiazolyl-2,5-bis(di-n-butyldithiocarbamate) was recrystallized from acetonitrile to a constant melting point of 77.5–78° C. Calculated for $C_{20}H_{36}N_4S_5$: N, 11.37. Found: N, 11.45, 11.56.

EXAMPLE 4

1.0 mole of 1,3,4-thiadiazolyl-2,5-disodium mercaptide (contained in 960 g. of aqueous solution) was charged into a 1-gallon glass vessel provided with thermometer, electrically heated dropping funnel, and high speed stirrer. Dimethylthiocarbamyl chloride (247 g., or 2.0 moles) was placed in the funnel and maintained in molten condition; this chloride had been distilled and contained substantially no free sulfur. Addition of the chloride to the mercaptide solution was carried out in 30 minutes, with stirring, the reaction mixture being maintained between 30° C. and 40° C.

Water (200 g.) was added to the resulting thick slurry, stirring was continued for 15 minutes, 20 g. of 20% sodium hydroxide solution was added, and the mixture was stirred 15 minutes more.

The solid product was recovered by filtration, washed with water, and dried at 60° C. There was thus obtained 275 g. (85% yield) of a powder, ivory in color, and having a melting point of 181–185° C. with decomposition.

The produce was found to be relatively insoluble in such common solvents as methyl alcohol, acetone, and benzene. However, it was soluble in hot dimethylformamide, and it was recrystallized from that solvent, recovered by filtration, washed with acetone, and dried at 80° C. M. P. 193–194.5° C. with decomposition. Calculated for $C_8H_{12}N_4S_5$: N, 17.27. Found: N, 17.33, 17.38.

EXAMPLE 5

Diisobutylthiocarbamyl chloride was prepared by reacting 408 g. (1.0 mole) of tetraisobutyl- thiuram disulfide, M. P. 70.5–71.5° C., with 71 g. (1.0 mole) of chlorine in 30 minutes, employing the same equipment and general procedure as in Example 2, and maintaining the reaction temperature between 65° C. and 75° C. The resulting mixture was allowed to stand at about 50° C. for 3 hours, during which time a large portion of the sulfur formed in the above reaction settled to the bottom of the flask. The diisobutylthiocarbamyl chloride was then decanted from the sulfur. A small sample of this chloride was cooled, yielding a tan solid melting at 46–48° C.

A 15% aqueous solution of 1,3,4-thiadiazolyl-2,5-disodium mercaptide containing 1.0 mole of the mercaptide was charged into the same apparatus as was used in Example 2. Stirring was commenced and the above decanted chloride, maintained at about 50° C. in the funnel, was added in 2 hours, while maintaining the temperature of the reaction mixture between 35° C. and 40° C. An aqueous solution of sodium sulfide weighing 326 g. and containing 1.0 mole of the sulfide was added to the mixture, which was stirred for another hour before being filtered. The resulting white solid, 1,3,4-thiadiazolyl-2,5-bis(diisobutyldithiocarbamate), was dried at about 50° C., and was found to melt at 106–109° C. The product thus obtained weighed 464 g., a yield of 94%.

This product was purified by recrystallization from acetonitrile; white crystalline powder, M. P. 109.5–111° C. Calculated for $C_{28}H_{36}N_4S_5$: N, 11.37; S, 32.53. Found: N, 11.37, 11.51; S, 32.4.

EXAMPLE 6

One mole of sym-di-n-butyldicyclohexylthiuram disulfide, M. P. 93–95° C., was converted to N-n-butyl-N-cyclohexylthiocarbamyl chloride by the general procedure of Example 2. The initial temperature of the reaction mixture was 95° C., but as the reaction progressed the temperature was gradually lowered, being 60° C. at the end of 40 minutes, when 1.0 mole of chlorine had been passed into the mixture. The final mixture was allowed to stand at room temperature for 3 hours, after which it was filtered to separate precipitated sulfur from the above chloride (a dark brown oil).

A 15% aqueous solution of 1,3,4-thiadiazolyl-2,5-disodium mercaptide containing 1.0 mole of this material was charged into the equipment of Example 2. Stirring was commenced and the above filtered chloride, containing a small amount of dissolved sulfur, was added in 30 minutes; it was not necessary to heat the funnel. During this time the reaction mixture was maintained between 45° C. and 50° C. This mixture, with the product present as an oil, was stirred for 45 minutes more, during which time the oil slowly congealed to a solid mass which became crystalline upon standing overnight. The aqueous solution was decanted from the solid, which was then pulverized, washed well with water, and rinsed with 1500 ml. of methyl alcohol. The resulting solid was slurried with acetone (1 liter), filtered, rinsed with 1 liter of acetone, and dried at 40° C. 1,3,4-thiadiazolyl-2,5,-bis(N-n-butyl-N-cyclohexyldithiocarbamate) was thus obtained as a tan solid weighing 360 g. and having a melting point of 134–141° C.

This product was purified by dissolving it in benzene at 50° C., filtering, adding an equal volume of hexane, cooling the solution to 10° C., filtering, and rinsing the solid with acetone; this recrystallization was followed by another from an equal-volume mixture of ethyl acetate and acetonitrile. The purified compound obtained in this manner, after being dried at 40° C., was a white powder, M. P. 145–146° C. Calculated for $C_{24}H_{40}N_4S_5$: N, 10.28. Found: N, 10.20, 10.17.

EXAMPLE 7

A solution of 240 g. (0.75 mole) of dicyclopentamethylenethiuram disulfide (M. P. 129–132° C.) in 500 ml. of benzene was charged into the chlorination apparatus of Example 2. The solution was stirred while 53.5 g. (0.75 mole) of chlorine was introduced in 30 minutes; the temperature of the reaction mixture was maintained between 35° C. and 45° C. during this period. The mixture was then allowed to stand at about 40° C. for 1 hour, and the benzene solution was decanted from a cake of amorphous sulfur which had been deposited. Benzene was removed by placing the solution under reduced pressure at 60° C. The residue consisted of oil and a small amount of sulfur. This oily cyclopentamethylenethiocarbamyl chloride, after being decanted from the sulfur, weighed 267 g.

This chloride was reacted with a 10% aqueous solution of 1,3,4-thiadiazolyl-2,5-disodium mercaptide containing 0.75 mole of the mercaptide, employing the same apparatus and general procedure as in Example 2. Addition of chloride to mercaptide solution was carried out in 30 minutes (heating of the dropping funnel being unnecessary) (temperature of reaction mixture, 45–50° C.), and the mixture was stirred for 30 minutes thereafter. An aqueous solution containing 1.0 mole of sodium sulfide and weighing 326 g. was then added to the mixture, which was stirred for 1 hour more. The resulting slurry was filtered, and the solid product was washed with water, rinsed with 1 liter of methyl alcohol, and dried at 90° C. The product was obtained as a tan powder weighing 138 g. and melting with decomposition at 183–185° C.

The solubility of this product in many of the more common solvents was not sufficient to permit recrystallization. However, it was recrystallized from a 1:3 mixture (by volume) of pyridine and dimethylformamide, filtered off, rinsed with acetone, and dried at 90° C., a pure product of melting point 185–186° C. (decomposition) being thus obtained. Calculated for $C_{14}H_{20}N_4S_5$: N, 13.85. Found: N, 13.63, 13.75.

EXAMPLE 8

The disubstituted thiocarbamyl chloride employed in this example and those employed in the next four examples were prepared by reacting 1 mole of thiophosgene with 2 moles of the appropriate secondary amine, in accordance with the general procedures described many years ago by various chemists such as Billeter, Von Braun, and Mazzara.

An aqueous solution (150 g.) of 1,3,4-thiadiazolyl-2,5-disodium mercaptide containing 0.15 mole of this material was placed in a 1-quart glass vessel provided with thermometer, electrically heated dropping funnel, and high speed stirrer. Stirring was commenced, and N-ethyl-N-phenylthiocarbamyl chloride, M. P. 58–59° C. (60 g., 0.3 mole) was added in molten condition to the stirred solution in 15 minutes, the temperature of the reaction mixture being maintained between 40° C. and 45° C.

Water (400 ml.) was then added to improve the fluidity of the mixture, and stirring was continued for an hour.

The solid product, after being recovered by filtration, was washed with water, rinsed with 750 ml. of methyl alcohol, and dried at 40° C. The 1,3,4 - thiadiazolyl - 2,5 - bis(N - ethyl - N-phenyldithiocarbamate) thus obtained was an ivory powder weighing 58 g. and melting 165–171° C.

This product was recrystallized from toluene, recovered by filtration, rinsed with methyl alcohol, and dried at 40° C. The purified compound was a white crystalline powder, M. P. 179–180° C. Calculated for $C_{20}H_{20}N_4S_5$: N, 11.76; S, 33.63. Found: N, 11.95, 12.02; S, 33.6.

EXAMPLE 9

The dibenzylthiocarbamyl chloride used in this experiment was a waxy solid, but it was easily maintained in liquid condition by heating it to 60° C. in the dropping funnel.

The apparatus and general procedure of Example 8 were employed to react approximately 0.3 mole of the above chloride with 0.15 mole of 1,3,4-thiadiazolyl-2,5-disodium mercaptide contained in 150 g. of an aqueous solution. Addition of the chloride was carried out in 15 minutes, the reaction mixture being maintained between 25° C. and 30° C. This mixture was stirred for 1 hour at about 40° C.

A gummy, plastic mass and an aqueous solution were present, and the latter was decanted. The mass was caused to solidify by chilling it to —10° C., after which it was pulverized. The powder was stirred with 500 ml. of 5% sodium hydroxide solution for 30 minutes at 0° C., filtered off, washed with ice water, and stirred with 1 liter of methyl alcohol at 10° C., and it again became of gummy consistency. The methyl alcohol was decanted and the gummy mass was dissolved in 250 ml. of hot acetone. The hot solution was filtered to remove a small amount of insoluble material, and the filtrate was diluted with methyl alcohol to the point of turbidity, cooled to 10° C., and more methyl alcohol was added; the total amount of alcohol used was 500 ml. The solid which crystallized from the solution was collected by filtration and air-dried. It weighed 25 g. and melted at 132–139° C. It was 1,3,4-thiadiazolyl-2,5-bis(dibenzyldithiocarbamate).

This compound was recrystallized by dissolving it in hot acetone, adding twice the volume of methyl alcohol, and cooling the solution. Filtration and air-drying yielded the compound as an ivory powder, M. P. 139–141° C. Calculated for $C_{32}H_{28}N_4S_5$: N, 8.91. Found: N, 8.57, 8.67.

EXAMPLE 10

The di-sec-butylthiocarbamyl chloride used in this experiment was obtained as a gelatinous red solid: 73 g. of this material was dissolved in 100 ml. of acetone for use in the reaction described below.

Employing the equipment and general procedure of Example 8, the chloride solution (without being heated in the funnel) was added in 20 minutes to 150 g. of a stirred aqueous solution of 1,3,4-thiadiazolyl-2,5-disodium mercaptide which contained 0.15 mole of the latter; the temperature of the reaction mixture was maintained between 35° C. and 40° C. Stirring was continued 1 more hour at the same temperature econditions.

The mixture, consisting of an oil and an aqueous solution, was poured into 1 liter of warm water, stirred for 10 minutes, and cooled to 10° C. The oil became a gummy solid, and the aqueous solution was decanted. The solid was washed successively with 500 ml. of 2% sodium hydroxide solution, 500 ml. of 2% hydrochloric acid solution, and 1 liter of warm water.

The solid (red and gummy) was crystallized by dissolving it in hot methyl alcohol, cooling the solution, recovering the solid thereby deposited, washing it with cold methyl alcohol, and air-drying it. This product, 1,3,4-thiadiazolyl-2,5-bis(di-sec-butyldithiocarbamate), was tan and crystalline, and melted at 96–97° C. Calculated for $C_{20}H_{36}N_4S_5$: N, 11.37. Found: N, 11.21, 11.25.

EXAMPLE 11

The di-n-octylthiocarbamyl chloride used in this experiment was a liquid of light reddish color.

The same equipment as used in Example 8 was charged with 125 g. of an aqueous solution of 1,3,4-thiadiazolyl-2,5-disodium mercaptide which contained 0.125 mole of this material. Stirring was commenced, and approximately 0.25 mole of the above chloride (not heated in the funnel) was added rapidly to the solution. The temperature of the reaction mixture was maintained between 35° C. and 45 C. during addition of the chloride and also during 1.5 hours of further stirring.

The reaction product, an oil, was successively washed with water, methyl alchol, 10% sodium hydroxide solution, 5% hydrochloric acid solution, and water. Finally, it was rinsed with methyl alcohol and dried under reduced pressure. The resulting 1,3,4 - thiadiazolyl - 2,5 - bis(di-n-octyldithiocarbamate) was a liquid weighing 20 g. Calculated for $C_{36}H_{68}N_4S_5$: N, 7.82. Found: N, 7.42, 7.30.

EXAMPLE 12

The same apparatus and general procedure were used as in Example 8.

Approximately 0.3 mole of dicyclohexylthiocarbamyl chloride was dissolved in 100 ml. of benzene. This solution (not heated in the funnel) was added rapidly, with stirring to 50 g. of an aqueous solution of 1,3,4-thiadiazolyl-2,5-disodium mercaptide containing 0.15 mole of the mercaptide. During this addition, the reaction mixture was maintained between 35° C. and 40° C., as well as during an additional 45 minutes of stirring.

The reaction product, a yellow, gummy solid, was removed from the liquid. It was thoroughly leached with 1 liter of methyl alcohol; this treatment converted the gum to a white crystalline solid. The product was successively washed with water, 2% sodium hydroxide solution, and water, and then rinsed with methyl alcohol and dried. The product thus obtained amounted to 70 g. and had a melting point of 179–184° C.

This compound was found to be relatively insoluble in a number of solvents which were tried for purposes of recrystallization. Therefore, it was further purified by leaching it thoroughly with acetone. It was filtered from the acetone, dried at 45° C., and was found to melt at 186–188° C. Calculated for $C_{28}H_{44}N_4S_5$: N, 9.39. Found: N, 9.06, 9.06.

EXAMPLE 13

An aqueous solution weighing 970 g. and containing 1.0 mole of 1,3,4-thiadiazolyl-2,5-disodium mercaptide was charged to a 2-liter beaker equipped with thermometer, electrically heated dropping funnel, and high speed stirrer. Distilled diethylthiocarbamyl chloride (294 g.), maintained in molten condition in the funnel, was added in 45 minutes to the stirred mercaptide solution, the temperature of this reaction mixture being maintained at about 30° C.

Dilute sodium hydroxide solution was then added; the resulting distinctly alkaline mixture became red. The mixture was filtered and the filter cake, consisting principally of 1,3,4-thiadiazolyl - 2,5 - bis(diethyldithiocarbamate) was washed with water. The cake was then stirred with dilute sodium hydroxide solution and the resulting slurry was filtered; these operations were repeated several times.

All of the alkaline filtrates were combined, and the solution was acidified with hydrochloric acid; 1,3,4-thiadiazolyl-2-thiol - 5 - diethyldithiocarbamate was thus precipitated in solid form. In this condition the product was red, but upon recrystallization from methyl alcohol it was obtained as a pale yellow solid which was recovered and dried. This purified product weighed 20 g. and had a melting point of 119.5–120.5° C. Calculated for $C_7H_{11}N_3S_5$: N, 15.9. Found: N, 16.2.

EXAMPLE 14

Tetraisopropylthiuram disulfide (528 g., 1.5 moles), M. P. 110–113° C., was dissolved in 800 g. of warm benzene; the solution was charged into a 2-liter, round-bottom flask fitted with stirrer, thermometer, and gas inlet tube. The solution was stirred vigorously while 106.5 g. (1.5 moles) of chlorine was introduced into it in 45 minutes, the reaction mixture being maintained between 50° C. and 60° C. The mixture comprised diisopropylthiocarbamyl chloride, benzene, and undissolved material; upon heating the mixture to 80° C., this material dissolved in the liquid. This solution was cooled to room temperature, whereupon sulfur precipitated in crystalline form, 73 g. being removed by filtration. The filtrate was placed under reduced pressure at 60° C. to remove benzene. The residue was diisopropylthiocarbamyl chloride melting at 69–71° C.

The apparatus and general procedure of Example 2 were used to react 359 g. (2.0 moles) of the above chloride with 1.0 mole of 1,3,4-thiadiazolyl-2,5-disodium mercaptide contained in 960 g. of aqueous solution. The chloride in molten condition was added to the solution in 1 hour, the temperature of the reaction mixture being maintained between 50° C. and 60° C.

Stirring was continued for 30 minutes after the chloride had been added; 82 g. of an aqueous solution of sodium sulfide containing 0.25 mole of the sulfide was added, and the mixture was stirred for another hour. The resulting slurry was filtered; the solid product was washed with water, filtered, and washed with 1 liter of cold methyl alcohol. The solid product was then dried; it weighed 245 g. and melted at 111–114° C.

This product was dissolved in 600 ml. of acetonitrile at 75° C., the resulting solution was filtered to remove a small amount of insoluble material, and the filtrate was cooled to 10° C. Crystals came out of solution and were recovered by filtration; they were rinsed with 500 ml. of cold methyl alcohol and dried at 50° C. 1,3,4-thiadiazolyl-2,5- bis(diisopropyldithiocarbamate) was thus obtained as light tan crystals, weighing 147 g. and melting at 116–117.5° C.

As a result of our invention, a second series of highly useful compounds is made available, namely, the isomers which result from the shifting of the respective N-substituted thiocarbamyl radicals from the side-chain sulfur atoms to the respective nearest nuclear nitrogen atoms in the case of the diesters; in the case of the monomercaptan-monoesters, from the shifting of the hydrogen atom and the N-substituted thiocarbamyl radical from the side-chain sulfur atoms to the respective nearest nuclear nitrogen atoms; and in the case of the monomercaptide-monoesters, from the shifting of the N-substituted thiocarbamyl radical from the side-chain sulfur atom to the nearest nuclear nitrogen atoms. The resulting compounds have the formulae

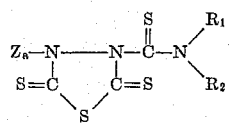

and

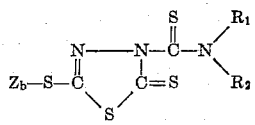

in which $Z_a$ represents one of the group consisting of hydrogen and the radical

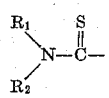

in which radical $R_1$ and $R_2$ have the same meanings as above; and in which $Z_b$ represents one of the group consisting of the alkali metals and ammonium.

This is illustrated by the following example.

EXAMPLE 15

The acetonitrile filtrate from Example 14 was allowed to stand in an ice bath for 2 hours, a crystalline solid precipitating during this period. This solid was collected by filtration, rinsed with cold methyl alcohol, and dried at 50° C. 3,4-bis(diisopropylthiocarbamyl) - 1,3,4 - thiadiazolidine-2,5-dithione was thus obtained as light greenish-yellow crystals weighing 30 g., and melting at 147-149° C.

The product of Example 14 was analyzed for nitrogen and sulfur with results as follows: N, 12.76, 12.71; S, 36.3. The following analytical results were obtained on the product of Example 15: N, 12.88, 12.81; S, 36.9. Theoretical values for both products are: N, 12.83; S, 36.70. These products are isomers.

The lower melting isomer is relatively insoluble in benzene, hot or cold, while the higher melting isomer is soluble in benzene.

The lower melting of these compounds was isomerized to the higher melting one by maintaining a mixture comprising 10 g. of the compound, M. P. 116-117.5° C., and 100 ml. of toluene under reflux (pot temperature, approximately 110° C.) for 12 hours; the solid went into solution soon after the toluene began to reflux. The solution remained clear when it was cooled to room temperature. However, solid material precipitated when 400 ml. of hexane was added and this mixture was allowed to stand for 2 hours at 10° C. The solid was removed by filtration, rinsed with 200 ml. of cold methyl alcohol, and dried. There was thus obtained 6 g. of ivory powder, M. P. 144.5-147.5° C. This material was dissolved in 20 ml. of hot toluene, and 100 ml. of hexane was added. When this mixture was allowed to stand at 20° C., a solid crystallized out. It was filtered off, rinsed with 50 ml. of methyl alcohol, and dried. The ivory powder weighing 4 g. melted at 147.5-149.5° C. A mixed melting point determination with the higher melting compound for which analytical data are given above showed that the two substances were identical.

The compounds of this invention are highly useful for a variety of purposes, of which the following illustrations are exemplary. Generally speaking, it will be found that the ester compounds usually are lower melting than the corresponding isomers.

EXAMPLE 16

The corrosion- and oxidation-inhibiting properties of a representative compound of the invention were evaluated by subjecting dilute solutions of the compound in mineral lubricating oil to the laboratory corrosion and oxidation test procedure of Hughes, Bartleson and Sunday, Analytical Chemistry 21, 737-43 (1949). The only variation from the procedure of Hughes et al. was that the tests reported herein were conducted for 8 hours instead of 10 hours.

The test solutions, i. e. finished lubricants, were prepared by dissolving small amounts of the additive in a base oil. The particular base oil employed was an SAE 20 mineral lubricating oil of Mid-Continent origin, and the particular additive was 1,3,4-thiadiazolyl-2,5-bis(di-n-butyldithiocarbamate).

Evaluation results obtained by applying the above test procedure to the treated oils and to the same base oil containing no additive are given in Table 1. In the table, A designates oils containing the above additive, and B designates the base oil with no additive.

Table 1

| Oil | Finished lubricant | | Corrosion, mg./sq. cm. | Acid number of oil after test |
|---|---|---|---|---|
| | Additive, percent by weight | Sulfur (from additive), percent by weight | | |
| A | 0.50 | 0.16 | 2.66 | 3.98 |
| A | 1.00 | 0.32 | 2.50 | 2.71 |
| A | 1.00 | 0.32 | 0.00 | 2.76 |
| B | 0 | 0 | 239.5 | 4.81 |

Thus it is seen that the corrosion-inhibiting characteristics of the above compounds are outstanding. It is pointed out that such compounds are likewise effective in inhibiting the formation of acidic substances, as is indicated by the acid numbers of above Table 1.

EXAMPLE 17

This example illustrates the efficacy of representative compounds of the invention as rubber vulcanization accelerators. The particular compounds employed were the products of Examples 2, 3, 4, 7, 14, and 15, respectively.

The respective accelerators were compounded with synthetic rubber (GR-S, a butadiene-styrene copolymer) according to the following formula:

GR-S _____ 100
EPC black _____ 50
Zinc oxide _____ 5
Coal tar softener _____ 5
Sulfur _____ 2
Accelerator _____ 1

Samples of the compositions thus prepared were vulcanized by heating in a press for varying periods of time at a temperature of 307° F. The original physical properties of the vulcanizates were determined, the results being as set forth in Table 2.

*Table 2.—Original properties*

VULCANIZATE WITH PRODUCT OF EXAMPLE 2

| Mins. cure @ 307° F. | Modulus 300% | Tensile strength | Elongation | Hardness |
|---|---|---|---|---|
| 30 | 1,110 | 2,190 | 480 | 62 |
| 40 | 1,450 | 1,980 | 360 | 62 |

VULCANIZATE WITH PRODUCT OF EXAMPLE 3

| | | | | |
|---|---|---|---|---|
| 30 | 400 | 1,350 | 730 | 57 |
| 40 | 950 | 2,690 | 640 | 62 |

VULCANIZATE WITH PRODUCT OF EXAMPLE 4

| | | | | |
|---|---|---|---|---|
| 30 | 1,080 | 2,990 | 650 | 65 |
| 40 | 1,520 | 3,280 | 540 | 67 |

VULCANIZATE WITH PRODUCT OF EXAMPLE 7

| | | | | |
|---|---|---|---|---|
| 30 | 1,130 | 2,700 | 580 | 63 |
| 40 | 1,520 | 2,980 | 510 | 65 |

VULCANIZATE WITH PRODUCT OF EXAMPLE 14

| | | | | |
|---|---|---|---|---|
| 30 | 780 | 1,810 | 550 | 60 |
| 40 | 1,010 | 1,920 | 470 | 62 |

VULCANIZATE WITH PRODUCT OF EXAMPLE 15

| | | | | |
|---|---|---|---|---|
| 30 | 800 | 2,000 | 580 | 60 |
| 40 | 1,010 | 2,220 | 530 | 62 |

Although the invention has been illustrated more particularly as applied to the reaction of N-substituted thiocarbamyl chlorides, it is to be understood that other halides may be employed. Thus the analogous N-substituted thiocarbamyl bromides and iodides may be reacted in aqueous or non-aqueous media with the mercaptides to give the desired products.

While in the particular description, the invention has been illustrated as being carried out in aqueous media, it is to be understood that this is not a necessary condition, and that if desired any other suitable solvent or diluent, particularly if substantially non-reactive or inert in the prevailing environment of the reaction, may be employed, such as a hydrocarbon solvent which may be aliphatic or aromatic, for example, benzene, toluene, hexane, etc., or a chlorinated hydrocarbon solvent which may be aliphatic or aromatic, for example, carbon tetrachloride, chlorobenzene, etc.

While the alkali metal and ammonium mercaptides have been dealt with more particularly above, it is to be understood that substituted ammonium mercaptides are contemplated, such as the monalkyl-, dialkyl-, trialkyl-, monoalkanol-, dialkanol-, and trialkanolammonium mercaptides (methyl, ethyl, propyl, butyl, amyl, ethanol, and propanol being examples of substituents on the ammonium radical), as well as other metal mercaptides, such as the zinc, lead, copper, mercury, silver, cadmium, thallium, tin, antimony, bismuth, molybdenum, iron, cobalt, nickel, selenium, calcium, strontium, barium, magnesium, and arsenic mercaptides. Likewise, mono-, di-, and polysulfides, such as derived by oxidation of the monomercaptans of this invention, are contemplated.

It is to be understood that the more particular description given above is by way of illustration, and that various modifications are possible and will occur to persons skilled in the art upon becoming familiar herewith. Accordingly, it is intended that the patent shall cover, by suitable expression in the claims, the features of patentable novelty which reside in the invention.

This application is a continuation-in-part of our co-pending applications Serial No. 258,502, filed November 27, 1951, now abandoned, and Serial No. 271,072, filed February 11, 1952.

We claim:

1. An organic compound having a formula of the group of formulae consisting of

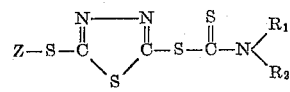

and

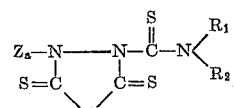

and

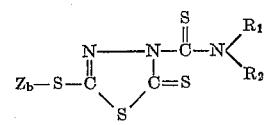

wherein $R_1$ taken individually represents one of the group consisting of alkyl, aralkyl, aryl, alkaryl, cycloalkyl, alkyl-substituted cycloalkyl, furfuryl, and tetrahydrofurfuryl radicals; wherein $R_2$ taken individually represents one of the group consisting of alkyl, aralkyl, cycloalkyl, alkyl-substituted cycloalkyl, furfuryl, and tetrahydrofurfuryl radicals; wherein $R_1$ and $R_2$ taken collectively represent one of the group consisting of polymethylene and oxapolymethylene radicals; wherein Z represents one of the group consisting of hydrogen, alkali metals, ammonium, and the radical

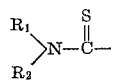

in which radicals $R_1$ and $R_2$ have the same meanings as above; wherein $Z_a$ represents one of the group consisting of hydrogen and the radical

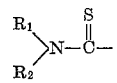

in which radicals $R_1$ and $R_2$ have the same meanings as above; and wherein $Z_b$ represents one of the group consisting of the alkali metals and ammonium.

2. 1,3,4 - thiadiazolyl - 2,5 - bis(dialkyldithiocarbamate).

3. The compound of claim 2 in which each alkyl group has from 1 to 8 carbon atoms.

4. 1,3,4 - thiadiazolyl - 2,5 - bis(diethyldithiocarbamate).

5. 1,3,4 - thiadiazolyl - 2,5 - bis(di-n-octyldithiocarbamate).

6. 1,3,4 - thiadiazolyl - 2,5 - bis(di-n-butyldithiocarbamate).

7. 1,3,4 - thiadiazolyl - 2,5 - bis(N - alkyl - N - aryldithiocarbamate).

8. 1,3,4 - thiadiazolyl - 2,5 - bis(N - ethyl - N - phenyldithiocarbamate).

9. 1,3,4 - thiadiazolyl - 2,5 - bis(N - alkyl - N - cycloalkyldithiocarbamate).

10. 1,3,4 - thiadiazolyl - 2,5 - bis(N - butyl - N-cyclohexyldithiocarbamate).

11. A process which comprises reacting together a compound having the formula

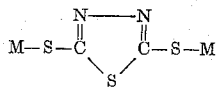

wherein M represents one of the group consisting of alkali metals and ammonium; and a compound having the formula

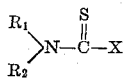

wherein X represents halogen; wherein $R_1$ taken individually represents one of the group consisting of alkyl, aralkyl, aryl, alkaryl, cycloalkyl, alkyl-substituted cycloalkyl, furfuryl, and tetrahydrofurfuryl radicals; wherein $R_2$ taken individually represents one of the group consisting of alkyl, aralkyl, cycloalkyl, alkyl-substituted cycloalkyl, furfuryl, and tetrahydrofurfuryl radicals; and wherein $R_1$ and $R_2$ taken collectively represent one of the group consisting of polymethylene and oxapolymethylene radicals.

12. The process of claim 11 in which the reaction is conducted under temperature conditions not exceeding 100° C.

13. The process of claim 11 in which temperature conditions are maintained between 20° C. and 80° C.

14. The process of claim 11 in which the reaction is conducted in an aqueous medium.

15. The process of claim 11 in which X is chlorine.

16. The process of claim 15 in which the reaction is conducted in an aqueous medium.

References Cited in the file of this patent

UNITED STATES PATENTS

| Number | Name | Date |
|---|---|---|
| Re. 19,286 | Zaucker et al. | Aug. 21, 1934 |
| 2,331,749 | Watt | Oct. 12, 1943 |
| 2,524,082 | Ritter et al. | Oct. 3, 1950 |